Feb. 7, 1967    T. A. AUSTIN    3,302,754
BRAKE APPARATUS
Filed Aug. 24, 1965
FIG. 1.
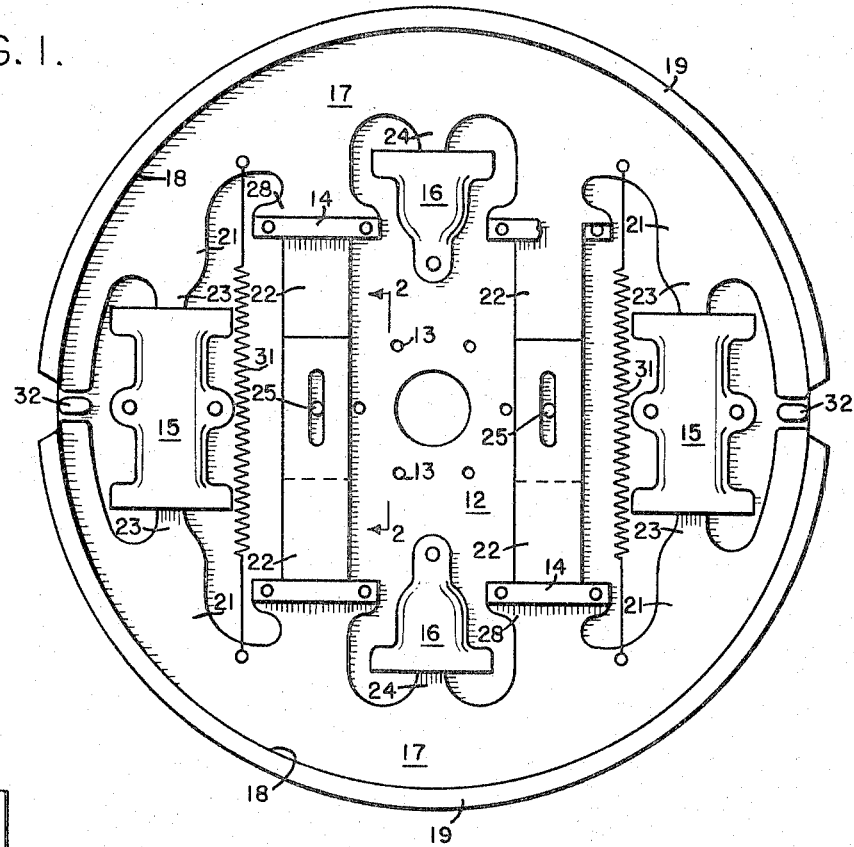
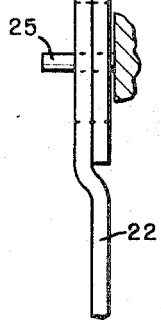
FIG. 2.
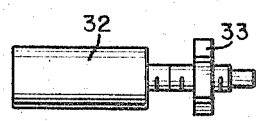
FIG. 3.
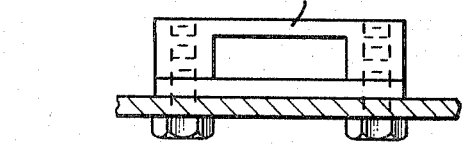
FIG. 4.
INVENTOR.
THOMAS A. AUSTIN
BY Joseph P. Flanagan
attorney

United States Patent Office 3,302,754
Patented Feb. 7, 1967

3,302,754
BRAKE APPARATUS
Thomas A. Austin, Mill Valley Road,
Belchertown, Mass. 02186
Filed Aug. 24, 1965, Ser. No. 482,172
2 Claims. (Cl. 188—78)

The present invention relates to an improved construction for a brake device and has as an object the provision of a brake apparatus which is relatively simple in construction and one in which the operating characteristics are enhanced over those mechanisms heretofore known to the art.

More specifically, this invention has an object the provision of a brake device in which the shoes and associated elements are constructed and arranged in a manner such that the shoes are more accurately guided in their movement to insure that the meeting of the brake linings with the brake drum will be accurately controlled.

Another object of this invention is the provision of a brake device wherein the shoe actuating pistons are subject to less thrust forces than are those of the prior art.

A further object of this invention is to provide a brake device having a simply constructed and operated adjusting means to take up wear on the brake lining.

Further objects and advantages of this invention will be apparent from the following description, taken in conjunction with the drawings, wherein:

FIG. 1 is a sectional elevation view of a brake assembly, with parts omitted, incorporating this invention.

FIG. 2 is a detail view of the brake shoe legs taken along the line 2—2 of FIG. 1.

FIG. 3 is a detail view of the adjusting means.

FIG. 4 is a detail view of the brake shoe guiding means of FIG. 1.

Referring to FIG. 1, a stationary mounting 12 is secured to a fixed part of the vehicle, such as the axle housing or the like, by means of a plurality of rivets, bolts, or other suitable fastening means 13. A plurality of brackets 14 are similarly secured to the mounting 12 as are a pair of cylinders 15 having opposed shoe engaging pistons, and a pair of cylinders 16 having single shoe engaging pistons.

The cylinders 15 and 16 may be of any conventional type and it will be understood that they will be caused to operate according to teachings well known in the art, that is, the pistons of the cylinders 15 will be actuated upon operation of the vehicle brake pedal while the pistons of the cylinders 16 will be actuated by operation of an emergency brake control. Such actuating mechanism forms no part of the present invention and reference may be had to U.S. Patent No. 3,047,100 for a fuller description of an actuating mechanism.

A set of arcuately shaped brake shoes 17 having rims 18 supporting a bonded or riveted lining 19 are mounted on the assembly for radial movement as described below.

Each brake shoe 17 has a web portion 21 from which extend slotted extensions 22. Additionally, each web 21 has a further series of extensions 23, 24 projecting therefrom.

The brake shoes 17 are mounted on the assembly in such a manner that the extensions 22 pass through the brackets 14, with the slots in such extensions cooperating with studs 25, mounted on or formed integral with the stationary mounting 12, passing therethrough. The extensions 23 and 24 abut the pistons of the cylinders 15 and 16 respectively, while projecting shoulders 28 formed on the shoes 17 rest on the brackets 14. The brake shoes are biased in their normal position of FIG. 1 by means of retaining springs 31 attached thereto.

Adjustably mounted on the stationary mounting 12 for cooperation with the ends of the brake shoes 17 are adjusting means comprising a threaded cam member 32 engaging a threaded opening in the mounting 12, and provided with a locking member 33. The adjusting means may be rotated as desired, to accommodate wearing of the lining 19, and locked in place by the member 33.

Upon actuation of the brake pedal of the vehicle, the rods, not shown, of the actuating pistons will move outward to cause the shoes 17, with their associated brake lining 19, to be forced against the brake drum, not shown. Upon release of such brake pedal, the shoes will be returned, under force of the springs 31. In returning to normal position, it will be appreciated that a large part or all of the thrust of the shoes 17 will be absorbed by the shoulders 28 abutting the brackets 14 and/or the ends of the shoes 17 abutting the cam member 32, should such cam members have been adjusted to compensate for wear on the linings, thus tending to reduce or eliminate the thrust forces imparted to the pistons of the cylinders 15 and 16.

Operation of the emergency actuating pistons of the cylinders 16 will be controlled by actuation of an emergency control lever or the like, with the resulting movement of the shoes, etc. being similar to that above described.

It will be appreciated to those skilled in the art that various changes may be made in the invention, without departing from the spirit and scope thereof. For example, all the actuating pistons of the cylinders 15, 16 could be actuated by a common brake pedal through independent connecting means such as a first means for actuation of the pistons of the cylinders 15 and a separate means for actuating the pistons of the cylinders 16. The invention, therefore, is not limited to that which is shown in the drawings and described in the specification, but only as indicated in the appended claims.

What is claimed is:

1. Brake apparatus comprising a base member mounted on a vehicle, said base member supporting guiding, actuating, and adjusting means mounted thereon, a plurality of flexibly interconnected brake shoes, each shoe having a rim portion and a web portion, a plurality of projections extending from said web portion intermediate the ends of said brake shoe, some of said projections operatively engaging said activating means, others of said projections having shoulders formed thereon, said shoulders abutting said guiding means, said guiding means encircling said last mentioned projections to closely restrict movement thereof in a plurality of directions.

2. The invention of claim 1 wherein said actuating means comprises a first set of double acting members each of said members acting on both said brake shoes, and a second set of single acting members, each of said latter members acting on one of said brake shoes.

References Cited by the Examiner
UNITED STATES PATENTS

| | | | |
|---|---|---|---|
| 2,072,755 | 3/1937 | Jones et al. | 188—78 |
| 2,137,991 | 11/1938 | La Londe | 188—78 X |
| 2,336,350 | 12/1943 | Fields et al. | 188—78 X |
| 2,389,405 | 11/1945 | Birchfield | 188—78 X |

OTHER REFERENCES 479,172  12/1951  Canada.

MILTON BUCHLER, Primary Examiner.

B. S. MOWRY, Assistant Examiner.